Figure 1:
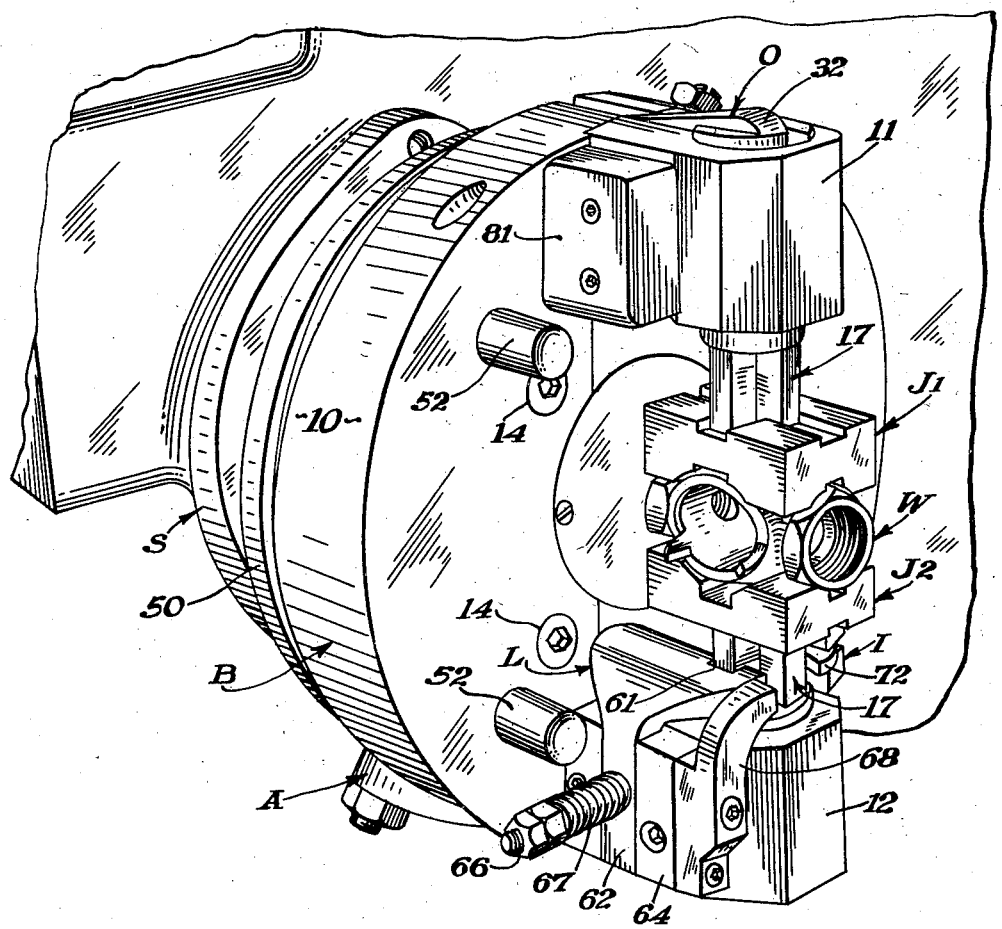

March 28, 1950   F. HUNZIKER   2,502,260
INDEXING CHUCK

Filed June 17, 1948   5 Sheets-Sheet 1

INVENTOR.
FRED HUNZIKER.
BY Richey & Watts
ATTORNEYS.

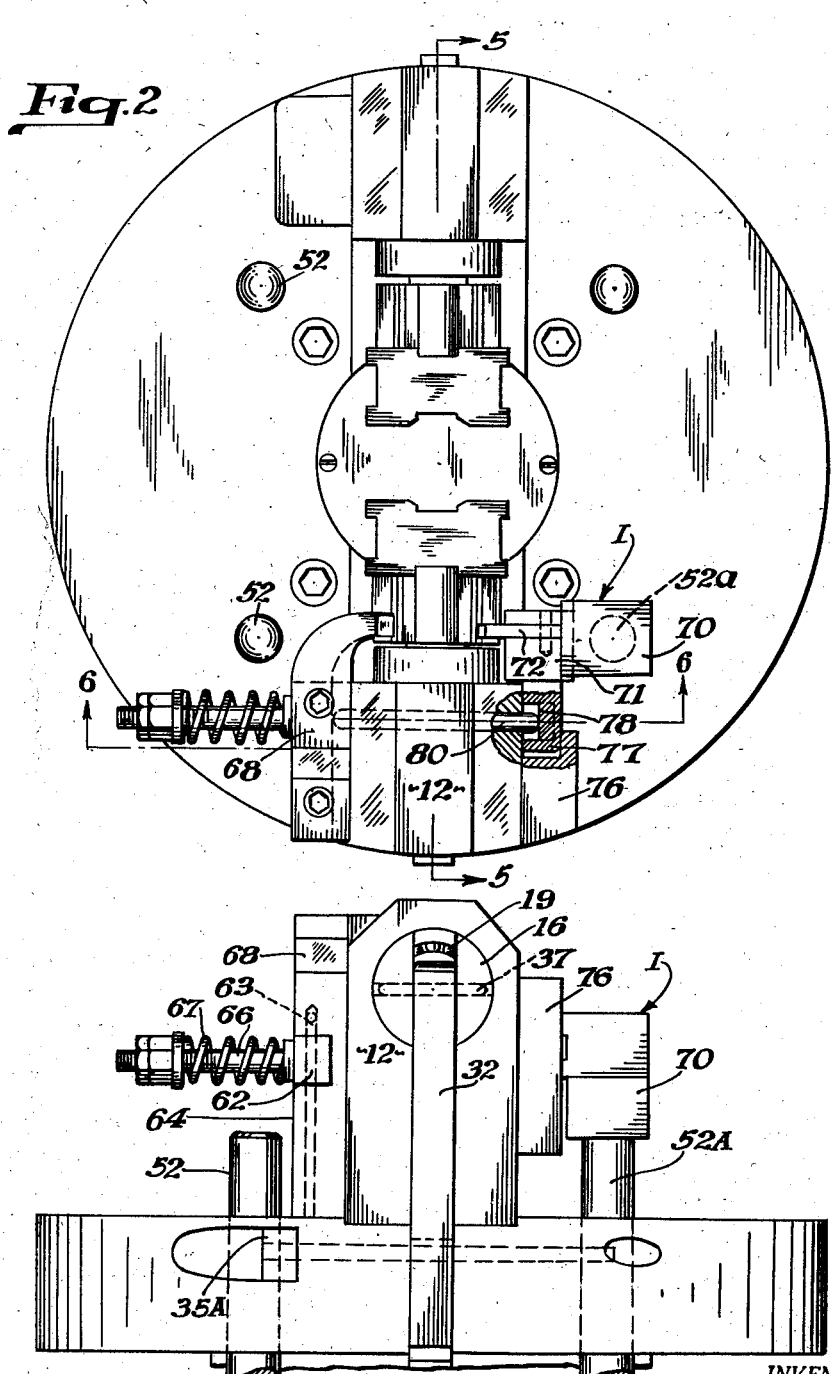

March 28, 1950 F. HUNZIKER 2,502,260
INDEXING CHUCK
Filed June 17, 1948 5 Sheets-Sheet 3
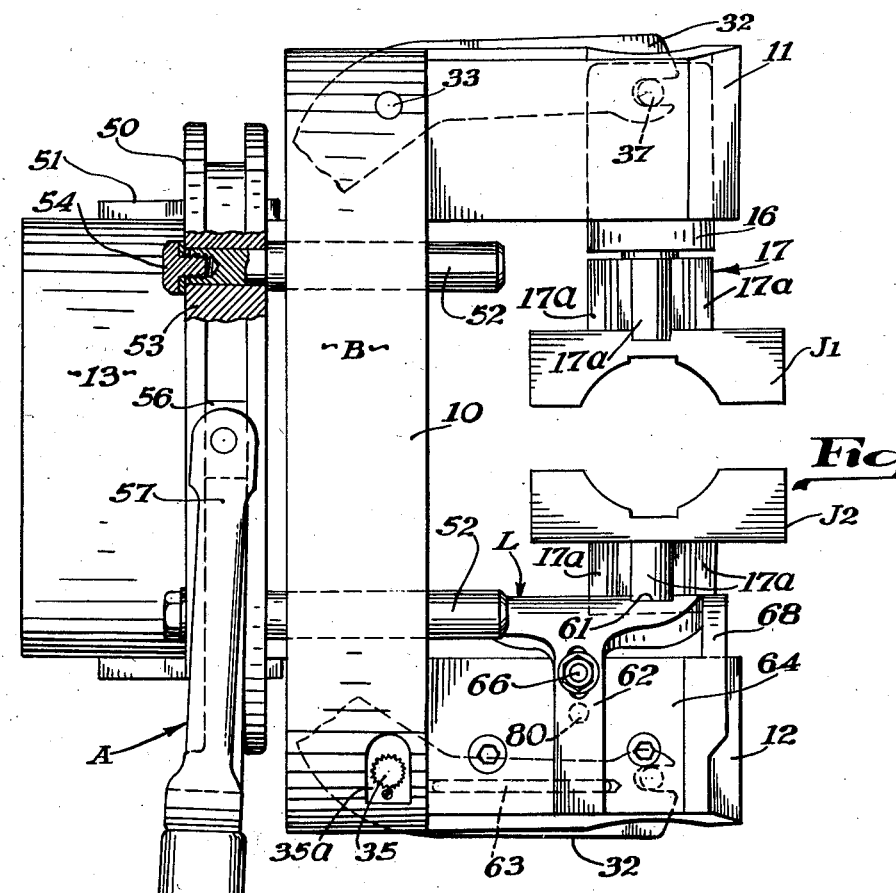
Fig. 4
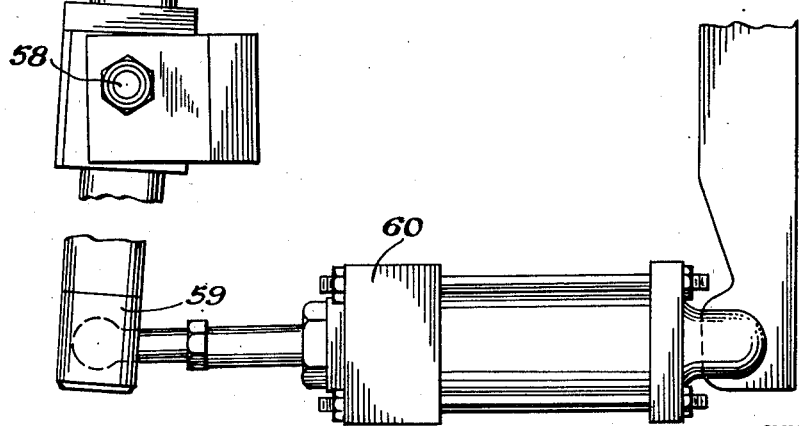
INVENTOR.
FRED HUNZIKER.
BY Richey & Watts
ATTORNEYS.

March 28, 1950  F. HUNZIKER  2,502,260
INDEXING CHUCK
Filed June 17, 1948  5 Sheets-Sheet 4
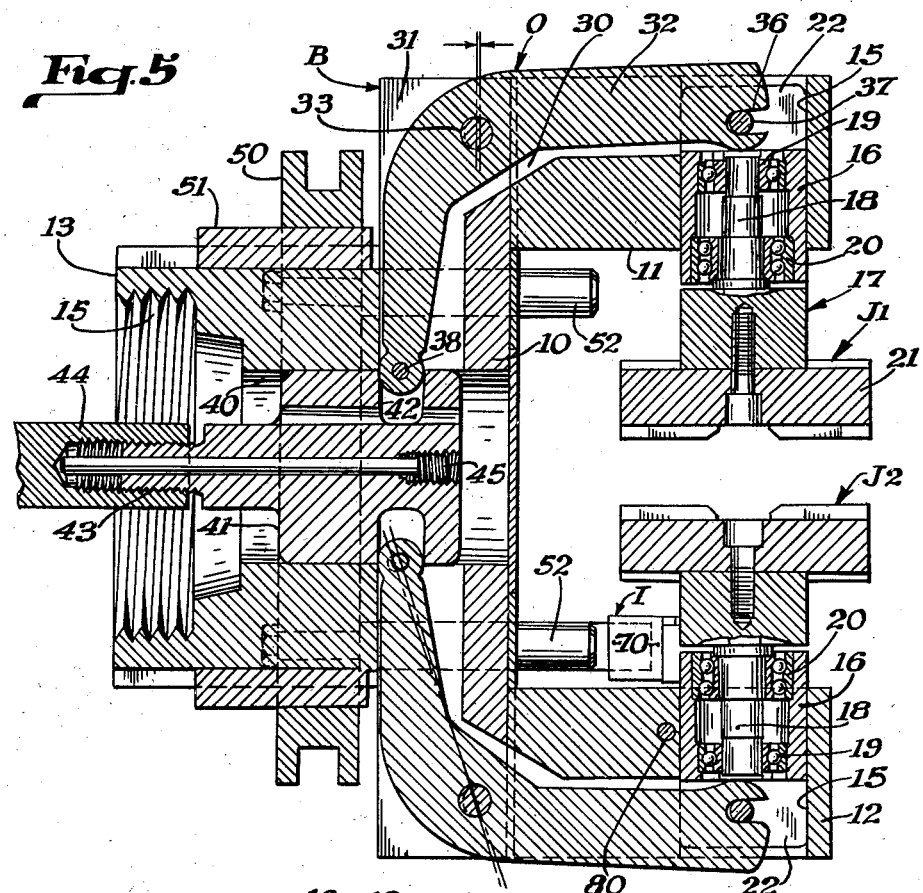
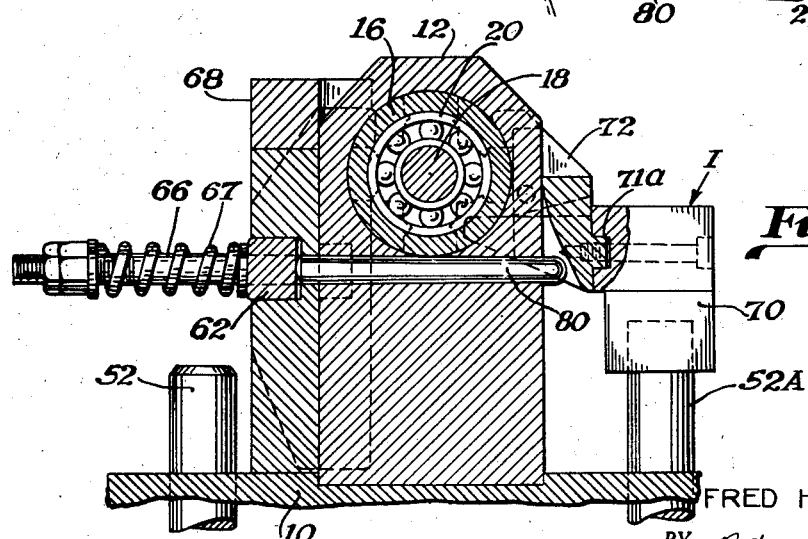
INVENTOR.
FRED HUNZIKER.
BY Richey & Watts
ATTORNEYS.

March 28, 1950   F. HUNZIKER   2,502,260
INDEXING CHUCK
Filed June 17, 1948   5 Sheets-Sheet 5
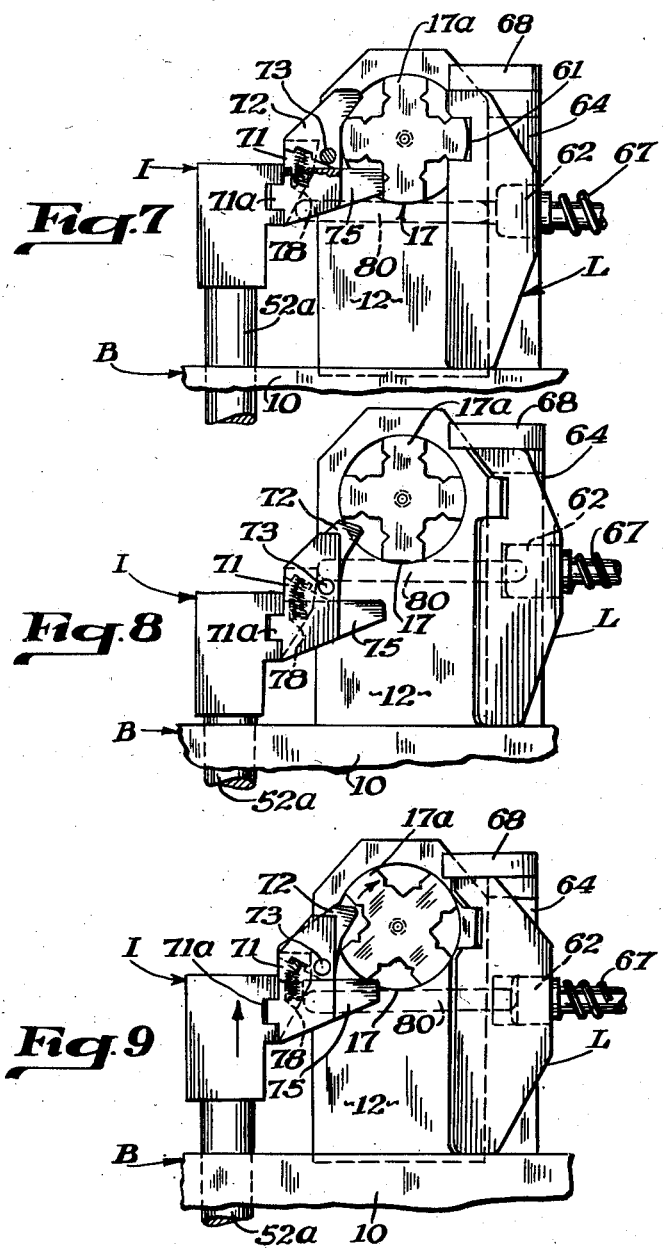
INVENTOR.
FRED HUNZIKER.
BY Richey & Watts
ATTORNEYS.

Patented Mar. 28, 1950

2,502,260

UNITED STATES PATENT OFFICE 2,502,260

INDEXING CHUCK

Fred Hunziker, Cleveland, Ohio, assignor to The Weatherhead Company, Cleveland, Ohio, a corporation of Ohio Application June 17, 1948, Serial No. 33,555

11 Claims. (Cl. 279—5)

This invention relates to indexing chucks.

It is an object of the invention to substantially maintain the balance of the chuck during indexing when the chuck is mounted on a spindle without resorting to the employment of radial slides for performance of the indexing operation, and without resorting to the employment of radially movable bearing blocks for supporting the indexing jaws. Briefly, this is accomplished by providing at least one of the jaws with an indexing wheel having a substantial axial extent, and turning the jaw by an indexing pawl mechanism that moves about an axis parallel to the axis of rotation of the chuck whereby, when the jaws are opened and closed, the indexing wheel slides along the indexing mechanism so that the supporting bearing block may be fixed on the chuck body.

Another object resides in making the latching mechanism extremely positive in its action and reducing its tendency to spring the parts, and in making a more rugged and simpler indexing wheel for association with the indexing and latching mechanism. In a preferred form, this is accomplished by making the indexing wheel a simple device having four generally radial arms, one of which is encompassed by a notch in the latching mechanism for positive location and another of which is engaged by the axially-extending indexing pawl device. Means are provided whereby the latch is withdrawn from the indexing wheel on the pawl positioning stroke, the indexing taking place on the reverse stroke. The latch is released for bearing against the periphery of the indexing arms after a portion of the indexing stroke has been completed and so snaps into place firmly locating the jaws at the completion of the indexing stroke.

Another object resides in provision of simple means for adjusting the relative positions of the jaws for gripping the work.

The manner in which the aforesaid objects and advantages are accomplished by a preferred form of the invention will be made clear by the following detailed description thereof.

Figure 5A:

In the drawings:

Fig. 1 is a perspective of the chuck;
Fig. 2 is a view of the face of the chuck;
Fig. 3 is a side view thereof;
Fig. 4 is a side view taken at 90° to Fig. 3;
Fig. 5 is a section taken on 5—5 of Fig. 2;
Fig. 5a shows the eccentric jaw adjuster pin;
Fig. 6 is a section taken on 6—6 of Fig. 2; and,
Figs. 7 to 9 are fragmentary views showing various steps in the indexing operation.

The chuck includes several major components; namely, a body B, indexing jaws $J_1$ and $J_2$, and indexing mechanism I, latch mechanism L and an actuating yoke mechanism A for the indexing mechanism. In addition, jaw opening and closing assembly O is provided.

The body 10 comprises a generally cylindrical plate to which is fastened fixed jaw bearing blocks 11 and 12, and a rearwardly extending sleeve 13 is bolted to the plate 10 by suitable fasteners 14. Sleeve 13 may have thread means 15 for attachment to the spindle S of a lathe or other machine tool in accordance with the usual practice.

The jaws $J_1$ and $J_2$ are formed in accordance with the requirements of the shape of the work W, and are mounted on thimbles 16 slidably disposed in bores 15 in the bearing blocks 11 and 12. Each jaw is supported by an indexing wheel 17 including generally radial arms 17a attached to a spindle 18 rotatably mounted by means of antifriction bearings 19 and 20 in thimble 16. The radially outer portion of each thimble 16 is slotted as at 22 for reception of the opening and closing mechanism.

In order to accommodate the jaw opening mechanism, bearing blocks 11 and 12 are notched as at 30 and the body plate 10 as at 31, there being a pair of bell-crank operator levers 32 pivotally mounted in the notches by means of an adjustable eccentric pivot pin 33. Pivot pin 33 includes an eccentric cam portion 34 disposed in a bore in lever 32, and a splined shank 35 for manipulation. Keeper block 35a is broached to receive spline 35 and fastened in place in the chuck to maintain the adjustment. One end of each bell-crank is slotted as at 36 to receive a pin 37 fixed in each thimble 16 and the other end is formed with a cylindrical nose 38. Mounting sleeve 13 has a central bore as at 40 for the slidable mounting of a piston member 41. Member 41 is grooved as at 42 to receive nose portions 38 of the bell-crank levers and includes a threaded stem 43 for attachment to a shank 44 which is operated by a fluid motor in the manner known in this art.

In order to operate the indexing mechanism when the chuck is rotatably mounted, a grooved collar 50 is slidably mounted on sleeve 13 and keyed thereto as at 51. Three guiding pins 52 extend through suitable apertures in plate 10, and are bolted to the ring 50 by means of a reduced stem 53 and the cap screw 54. In the form shown pins 52 move parallel to the axis of rotation of the chuck body but in the broader aspects of the invention it is only essential that they move normal to the generally radial arms 17a. In order to reciprocate the ring 50 while the chuck is turning, blocks 56 are fitted to the groove in the ring and are pivotally mounted in the yoke member 57 forming part of the actuating mechanism A. The yoke is pivoted to the frame as at 58 and may have a portion 59 for swivel connection with an actuating fluid motor 60. Of course, suitable controls for both fluid motors are provided, such controls being well known in this art.

The latch mechanism L inludes T-shaped member notched as at 61 to receive any one of the arms 17a of the associated indexing wheel 17. The shank 62 of latch L rests in a suitable groove in the block 64 fastened to bearing block 12 and the latch is pivoted in the block by any suitable pivot means, such as 63. The latch is urged toward engagement with the indexing wheel by means of a fixed bolt 66 and a spring 67.

The fourth guide pin 52a mounts portions of the indexing mechanism I, there being a block 70 fastened thereto which carries a pawl assembly 71 that may be accurately located by means of a tongue 71a. A spring-pressed pawl 72 is pivoted in block 71 by means of pin 73 and block 71 may also include a finger 75 that assists in positioning the indexing wheel. Block 71 also is formed with a cam surface 78 for engagement with a cross pin 80. the other end of which is arranged to withdraw the latch mechanism by pressing against the shank 62 thereof. As seen in Fig. 1, a suitable balancing weight 81 may be provided to substantially balance out the weight of the latch and indexing mechanism.

During the cutting or turning operations, the parts assume the position shown in Figs. 1 to 7, inclusive. The notch 61 in the latch L fully encompasses opposed faces of one of the radial arms 17a. Finger 75 on the indexing mechanism engages the side of another of the arms and assists in locating the jaws. When indexing is initiated, actuating mechanism A retracts collar 50 and pin 52a draws block 70 toward plate 10. During initial retraction, finger 75 and notch 61 prevent rotation of the jaws, but simultaneously cam 78 urges pin 80 against shank 62 of the latch causing it to withdraw from the associated radial arm against pressure of spring 67. The indexing wheel 17 cannot turn until the latch L is clear of the associated radial arm 17a, and when this happens (as seen in Fig. 8) pawl 72 is disposed behind one side of the associated arm 17a. The retracted position before indexing is shown in Fig. 8. The control for the actuating motor 60 is manipulated to cause advance of collar 50 whereupon (as seen in Fig. 9) the forward face of the pawl 72 engages one side of the radial arm 17a causing rotation of the jaws. Likewise, finger 75 soon engages another arm and assists in the indexing. Simultaneously cam surfaces 78 slide away from the end of pin 80 so that spring 67 can force the latch L toward the indexing wheel. As seen in Fig. 9, position is soon reached wherein surfaces of the latch L ride on the periphery of one or more arms 17a, after which the cam surface can entirely clear pin 80 and the latch will snap into place and firmly locate the approaching arm 17a when a quarter-turn has been imparted to the indexing wheel. The parts again come to rest in the position shown in Fig. 7.

It can be seen that the indexing mechanism is relatively simple and requires no radial slides, racks and pinions and the like, and has little tendency to upset the dynamic balance of the chuck when the chuck is mounted on a rotating spindle. Furthermore, the latching mechanism L firmly locates the indexing wheel in a manner whereby there is no tendency for the parts to spring. Also, due to the fact that both the indexing and latch mechanism work different arms, and due to the fact that the arms are symmetrical, the arms or the notches between the arms (depending on how they are considered) can be made equal in number to the number of index positions. This results in a sturdy construction without requiring an increase in diameter of the indexing wheel to provide for intermediate operating notches and the like. Also the fact that the arms are substantially radial increases their strength. Due to that the latch mechanism is positively withdrawn by means controlled by the indexing mechanism, rather than being forced clear by the indexing wheel, a very positive latching operation is effected.

The indexing wheel may be simple and rugged by utilizing opposed arms for latching and indexing and by withdrawing the latch on the retract stroke on the indexing mechanism. The eccentric adjustment for the jaw-operating members is simple and effective and permits minor adjustments for various sizes of work, although the major adjustments are effected by properly proportioning the jaws $J_1$ and $J_2$.

Although I prefer that both jaws move relative to the body during their opening and closing motions, it is obvious that one jaw may be fixed and the other one moved relative thereto to grip and release the work. Also, those skilled in the art will recognize that many of the advantages incident to the invention will be realized whether the chuck body be rotatably mounted as shown in the preferred form, or fixed for use in a multiple machine tool such as the well-known Kingsbury machines.

Having completed a detailed description of a preferred embodiment of my invention, it will be understood that various changes and modifications thereof may be made without departing from the essence of the invention and its mode of operation as defined in the appended claims.

What is claimed is:

1. An indexing chuck comprising a body for attachment to a machine tool, a pair of aligned chuck jaws mounted on said body for indexing rotation about a diametric axis and for relative opening and closing motion along said axis, means mounted on said body for opening and closing said jaws, an indexing wheel for one of said jaws and having four equally spaced, generally radial arms, latch mechanism having a notch normally encompassing one of said arms for positively positioning said one jaw, indexing mechanism mounted on said body for reciprocation normal to the axis of rotation of said indexing mechanism, said indexing mechanism including pawl means for engaging the side of another of said arms to index said jaw when moved in one direction, and actuating means associated with said indexing and latch mechanisms to withdraw said latch mechanism from the associated arm upon motion of said indexing mechanism in the other direction.

2. An indexing chuck comprising a rotatable body for attachment to a rotary machine spindle, a pair of aligned chuck jaws mounted on said body for indexing rotation about a diametric axis and for relative opening and closing motion along said axis, means mounted on said body for opening and closing said jaws, an indexing wheel rotatable with one of said jaws and having a plurality of generally radial abutment faces, latch mechanism normally engaging opposed abutment faces for positively positioning said one jaw, indexing mechanism mounted on said rotatable body for reciprocation parallel to the axis of rotation thereof, said indexing mechanism including pawl means for engaging said indexing wheel abutment surfaces to index said jaw when moved in one direction and actuating means associated with said indexing and latch mechanism to withdraw said latch mechanism upon motion of said indexing mechanism in the other direction.

3. An indexing chuck comprising a rotatable body for attachment to a rotary machine spindle, a pair of aligned chuck jaws mounted on said body for indexing rotation about a diametric axis and for relative opening and closing motion along said axis, means mounted on said body for opening and closing said jaws, an indexing wheel for one of said jaws and having four equally-spaced generally radial arms, latch mechanism including an arm member having a notch normally encompassing one of said arms for positively positioning said one jaw, indexing mechanism mounted on said body for reciprocation parallel to the axis of rotation thereof, said indexing mechanism including pawl means for engaging the side of another of said arms to index said jaw when moved in one direction, and actuating means associated with said indexing and latch mechanisms to withdraw said latch mechanism from the associated arm upon motion of said indexing mechanism in the other direction.

4. An indexing chuck comprising a rotatable body for attachment to a rotary machine spindle, a pair of aligned chuck jaws mounted on said body for indexing rotation about a diametric axis and for relative opening and closing motion along said axis, means mounted on said body for opening and closing said jaws, an indexing wheel for one of said jaws and having a plurality of abutment faces generally parallel to said diametric axis, latch mechanism normally engaging opposed abutment faces for positively positioning said one jaw, indexing mechanism mounted on said body for reciprocation parallel to the axis of rotation thereof, said indexing mechanism including pawl means for engaging said wheel abutment surfaces to index said jaw when moved in one direction, and actuating means associated with said indexing and latch mechanisms to withdraw said latch mechanism upon motion of said indexing mechanism in the other direction, said actuating means releasing said latch mechanism for engagement with the periphery of said arms after said indexing mechanism has partially completed its indexing stroke.

5. An indexing chuck comprising a rotatable body for attachment to a rotary machine spindle, a pair of aligned chuck jaws mounted on said body for indexing rotation about a diametric axis and for relative opening and closing motion along said axis, means mounted on said body for opening and closing said jaws, an indexing wheel for one of said jaws and having a plurality of generally radial arms, latch mechanism having a notch normally encompassing one of said arms for positively positioning said one jaw, indexing mechanism mounted on said body for reciprocation parallel to the axis of rotation thereof, said indexing mechanism including pawl means for engaging a generally radial surface of another of said arms to index said jaw when moved in one direction, and actuating means associated with said indexing and latch mechanisms to withdraw said latch mechanism upon motion of said indexing mechanism in the other direction, said actuating means releasing said latch mechanism for engagement with the periphery of said arms after said indexing mechanism has partially completed its indexing stroke.

6. An indexing chuck comprising a rotatably body for attachment to a rotary machine spindle, a pair of aligned chuck jaws mounted on said body for indexing rotation about a diametric axis and for relative opening and closing motion along said axis, means pivotally mounted on said body for opening and closing said jaws, an operator means for actuating said pivotally-mounted means, means for adjusting the location if said pivotal mounting relative to said body, indexing wheel for one of said jaws and having a plurality of abutment faces generally parallel to said diametric axis, indexing mechanism mounted on said body for reciprocation parallel to the axis of rotation of said body, said indexing mechanism including pawl means for engaging said wheel abutment surfaces to index said jaw when moved in one direction.

7. An indexing chuck comprising a rotatable body for attachment to a rotary machine spindle, a pair of opposed jaw support members fixed to said body, a pair of aligned chuck jaws mounted on said jaw support members for indexing rotation about a diametric axis and for relative opening and closing motion along said axis, means mounted on said body for opening and closing said jaws, an indexing wheel for one of said jaws and having a plurality of abutment faces generally parallel to said diametrical axis, latch mechanism normally engaging opposed abutment faces for positively positioning said one jaw, a bore in said body parallel to the axis of rotation thereof, a pin slidable in said bore, a collar mounted on said pin behind said body, indexing pawl means for engaging said wheel abutment surfaces to index said jaw when moved in one direction, said indexing wheel moving axially relative to said indexing pawl mechanism during opening and closing of said jaws.

8. An indexing chuck comprising a rotatable body for attachment to a rotary machine spindle, a pair of opposed jaw support members fixed to said body, a pair of aligned chuck jaws mounted on said jaw support members for indexing rotation about a diametric axis and for relative opening and closing motion along said axis, means mounted on said body for opening and closing said jaws, an indexing wheel for one of said jaws and having a plurality of abutment faces generally parallel to said diametrical axis, latch mechanism normally engaging opposed abutment faces for positively positioning said one jaw, a bore in said body parallel to the axis of rotation thereof, a pin slidable in said bore, a collar mounted on said pin behind said body, indexing pawl means for engaging said wheel abutment surfaces to index said jaw when moved in one direction, said indexing wheel moving axially relative to said indexing pawl mechanism during opening and closing of said jaws, and actuating means associated with said indexing and latch mechanisms to withdraw said latch mechanism upon motion of said indexing mechanism in the other direction.

9. An indexing chuck comprising a rotatable body for attachment to a rotary machine spindle, a pair of opposed jaw support members fixed to said body, a pair of aligned chuck jaws mounted on said jaw support members for indexing rotation about a diametric axis and for relative opening and closing motion along said axis, means mounted on said body for opening and closing said jaws, an indexing wheel for one of said jaws and having a plurality of abutment faces generally parallel to said diametrical axis, latch mechanism normally engaging opposed abutment faces for positively positioning said one jaw, a bore in said body parallel to the axis of rotation thereof, a pin slidable in said bore, a collar mounted on said pin behind said body, indexing pawl means for engaging said wheel abutment surfaces to index said jaw when moved in one direction, said indexing wheel moving axially relative to said indexing pawl mechanism during opening and closing of said jaws, and actuating means associated with said indexing and latch mechanisms to withdraw said latch mechanism upon motion of said indexing mechanism in the other direction, said actuating mechanism comprising a cam movable with said indexing means, and a follower carried by the associated support member and engaging said latch means.

10. An indexing chuck comprising a body for attachment to a machine spindle, a plurality of chuck jaws mounted on said body for indexing rotation about a radical axis and for relative opening and closing motion along said axis, means mounted on said body for opening and closing said jaws, an indexing wheel for one of said jaws and having a plurality of abutment faces generally parallel to said diametric axis, means formed in said body for guiding a member in straight line axial motion, rod means slidable along said guide means, pawl means movable by said rod means for engaging said wheel abutment surfaces to index said jaw when said rod means reciprocates, and means to reciprocate said rod means, said index wheel abutment surfaces being of longer diametric extent than said pawl means and sliding therealong during opening and closing motion of said jaws.

11. An indexing chuck comprising a body for attachment to a machine spindle, a pair of aligned chuck jaws mounted on said body for indexing rotation about a diametric axis and for relative opening and closing motion along said axis, means mounted on said body for opening and closing said jaws, an indexing wheel for one of said jaws and having a plurality of abutment faces generally parallel to said diametric axis, a generally axially extending aperture formed in said body, rod means slidable along said guide means, pawl means mounted on said rod means for engaging said wheel abutment surfaces to index said jaw when said rod means reciprocates, and means to reciprocate said rod means, said index wheel abutment surfaces being of longer diametric extent than said pawl means and sliding therealong during opening and closing motion of said jaws.

FRED HUNZIKER.

REFERENCES CITED

The following references are of record in the file of this patent:

UNITED STATES PATENTS

| Number | Name | Date |
|---|---|---|
| 119,516 | Hayden | Oct. 3, 1871 |
| 961,867 | Kruz | June 21, 1910 |
| 1,801,602 | Hunzeker | Apr. 21, 1932 |
| 1,878,320 | Potter | Sept. 20, 1932 |
| 2,349,119 | Sonle | May 16, 1944 |

FOREIGN PATENTS

| Number | Country | Date |
|---|---|---|
| 328,776 | Germany | Oct. 24, 1919 |

OTHER REFERENCES

Lawrence Bastrup, American Machinist, page 145, July 17, 1947.